US008599192B2

(12) United States Patent
Kim et al.

(10) Patent No.: US 8,599,192 B2
(45) Date of Patent: Dec. 3, 2013

(54) LIQUID CRYSTAL DISPLAY AND METHOD OF DRIVING THE SAME BASED ON RECOGNIZED MOTION

(75) Inventors: Bo-Ra Kim, Asan-si (KR); Jae-Hyoung Park, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 599 days.

(21) Appl. No.: 12/617,162

(22) Filed: Nov. 12, 2009

(65) Prior Publication Data

US 2010/0207953 A1   Aug. 19, 2010

(30) Foreign Application Priority Data

Feb. 18, 2009   (KR) .................. 10-2009-0013545

(51) Int. Cl.
*G09G 5/00* (2006.01)

(52) U.S. Cl.
USPC ........................................................ 345/214

(58) Field of Classification Search
None
See application file for complete search history.

(56) References Cited

U.S. PATENT DOCUMENTS

| | | | | |
|---|---|---|---|---|
| 2003/0080983 A1* | 5/2003 | Someya et al. | ............... | 345/690 |
| 2004/0263538 A1* | 12/2004 | Ohta et al. | ................... | 345/690 |
| 2007/0200839 A1* | 8/2007 | Sampsell | ....................... | 345/204 |
| 2007/0230830 A1* | 10/2007 | Ohwaki et al. | ................ | 382/300 |
| 2008/0018571 A1* | 1/2008 | Feng | ................................ | 345/87 |
| 2008/0136752 A1* | 6/2008 | Inoue et al. | ..................... | 345/77 |
| 2009/0322777 A1* | 12/2009 | Lu et al. | ......................... | 345/582 |

FOREIGN PATENT DOCUMENTS

| KR | 1020030002608 | 1/2003 |
|---|---|---|
| KR | 1020040030096 | 4/2004 |
| KR | 1020040099250 | 11/2004 |

* cited by examiner

*Primary Examiner* — Hoa T Nguyen
*Assistant Examiner* — Mark Fischer
(74) *Attorney, Agent, or Firm* — F. Chau & Associates, LLC

(57) ABSTRACT

A LCD includes: a display panel and a signal controller. The display panel includes n pixels arranged in a matrix, wherein n is a natural number. The signal controller sequentially receives first through 2n-th pixel image signals, sequentially calculates a difference between a k-th pixel image signal and a (n+k)-th pixel image signal, recognizes the (n+k)-th pixel image signal as a motion signal when the difference is greater than a first reference value and recognizes the (n+k)-th pixel image signal as a non-motion signal when the difference is equal to or less than the first reference value, and determines whether the (n+k)-th pixel image signal is a moving-image signal based on numbers of motion signals and non-motion signals recognized. An image signal of a previous frame includes the first through n-th pixel image signals and an image signal of a current frame includes the (n+1)-th through 2n-th pixel image signals.

20 Claims, 6 Drawing Sheets

LIQUID CRYSTAL DISPLAY AND METHOD OF DRIVING THE SAME BASED ON RECOGNIZED MOTION

This application claims priority to Korean Patent Application No. 10-2009-0013545, filed on Feb. 18, 2009 in the Korean Intellectual Property Office, the disclosure of which is incorporated by reference in its entirety herein.

BACKGROUND OF THE INVENTION

1. Technical Field

The present disclosure relates to a liquid crystal display (LCD) and a method of driving the same.

2. Discussion of Related Art

Display apparatuses such as an organic light emitting device (OLED), a plasma display panel (PDP), and a liquid crystal display (LCD) have been developed as substitutes for a cathode ray tube (CRT), which may be heavier and less energy efficient. A PDP is a device that displays characters or images using plasma generated by a gas-discharge, and an OLED is a device that displays characters or images using electroluminescence of a specific organic material or high molecular weight polymeric compounds.

A liquid crystal display (LCD) includes a liquid crystal panel having a first substrate, a second substrate, and a dielectrically anisotropic liquid crystal layer disposed between the first substrate and the second substrate. The first substrate has a plurality of pixel electrodes disposed thereon and either the first substrate or the second substrate has a common electrode disposed thereon.

In one method of driving an LCD, which may reduce response time of liquid crystals, an image signal of a previous frame is compared with an image signal of a current frame to generate a corrected image signal of the current frame. In another driving method, which may improve motion blur characteristics of moving images, an image signal of a current frame is compared with an image signal of a previous frame to generate an interpolated image signal inserted between the image signals of the two frames, thereby increasing a frame driving frequency.

The above driving methods require use of a frame memory that stores an image signal of a previous frame. In addition, data compression technology is needed to minimize the size of an image signal that is stored in the frame memory.

However, if an input image signal of a previous frame includes a noise component, which erroneously causes an image signal of a current frame to be recognized as a moving-image signal, a corrected image signal or an interpolated image signal may unnecessarily be generated. Further, the noise component may be amplified in the process of compressing and then reconstructing an image signal, thereby degrading display quality of an LCD.

Thus, there is a need for an LCD and a method of driving an LCD that can reduce the likelihood that a pixel image signal is erroneously recognized as a moving-image signal due to a noise component.

SUMMARY OF THE INVENTION

An LCD according to an exemplary embodiment of the present invention includes: a display panel and a signal controller. The display panel includes n pixels arranged in a matrix and n is a natural number. The signal controller sequentially receives first through n-th pixel image signals included in a image signal of a previous frame and (n+1)-th through 2n-th pixel image signals included in a image signal of a current frame, sequentially calculates a difference between a k-th pixel image signal of the first through n-th pixel image signals and a (n+k)-th pixel image signal of the (n+1)-th through 2n-th pixel image signals, recognizes the (n+k)-th pixel image signal as a motion signal when the difference is greater than a first reference value and recognizes the (n+k)-th pixel image signal as a non-motion signal when the difference is equal to or less than the first reference value, and determines whether the image signal of the current frame including the (n+k)-th pixel image signal is a moving-image signal based on numbers of motion signals and non-motion signals recognized. The first through n-th pixel image signals correspond to the n pixels, respectively. The (n+1)-th through 2n-th pixel image signals correspond to the n pixels, respectively, and k is a natural number ranging from 1 to n.

A method of driving an LCD according to an exemplary embodiment of the present invention includes: sequentially receiving first through n-th pixel image signals included in a image signal of a previous frame and (n+1)-th through 2n-th pixel image signals included in a image signal of a current frame for a display panel of the LCD that comprises n pixels arranged in a matrix, where n is a natural number, sequentially calculating a difference between a k-th pixel image signal of the first through n-th pixel image signals and a (n+k)-th pixel image signal of the (n+1)-th through 2n-th pixel image signals, recognizing the (n+k)-th pixel image signal as a motion signal when the difference is greater than a first reference value and recognizing the (n+k)-th pixel image signal as a non-motion signal when the difference is equal to or less than the first reference value, and determining whether the image signal of the current frame including the (n+k)-th pixel image signal is a moving-image signal based on numbers of motion signals and non-motion signals recognized. The first through n-th pixel image signals correspond to the n pixels, respectively. The (n+1)-th through 2n-th pixel image signals correspond to the n pixels, respectively, and k is a natural number ranging from 1 to n.

An LCD according to an exemplary embodiment of the present invention includes: a display panel and a signal controller. The display panel comprises n pixels arranged in a matrix and n is a natural number. The signal controller sequentially receives first through n-th pixel image signals included in a image signal of a previous frame and (n+1)-th through 2n-th pixel image signals included in a image signal of a current frame, recognizes the (n+k)-th pixel image signal as a motion signal when the difference is greater than a first reference value and recognizes the (n+k)-th pixel image signal as a non-motion signal when the difference is equal to or less than the first reference value, and recognizes the image signal of the current frame including the (n+k)-th pixel image signal as a moving-image signal when the (n+k)-th pixel image signal is a motion signal and when a pixel image signal corresponding to at least one surrounding pixel of a pixel, which corresponds to the (n+k)-th pixel image signal, is a motion signal. The first through n-th pixel image signals correspond to the n pixels, respectively. The (n+1)-th through 2n-th pixel image signals correspond to the n pixels, respectively, and k is a natural number ranging from 1 to n.

A method of driving an LCD according to an exemplary embodiment of the present invention includes: sequentially receiving first through n-th pixel image signals included in a image signal of a previous frame and (n+1)-th through 2n-th pixel image signals included in a image signal of a current frame for a display panel of the LCD that comprises n pixels arranged in a matrix, where n is a natural number, sequentially calculating a difference between a k-th pixel image signal of the first through n-th pixel image signals and a (n+k)-th pixel image signal of the (n+1)-th through 2n-th pixel image signals, recognizing the (n+k)-th pixel image signal as a motion signal when the difference is greater than a first reference value and recognizing the (n+k)-th pixel image signal as a non-motion signal when the difference is equal to or less than the first reference value, and recognizing the image signal of a current frame including the (n+k)-th pixel image signal as a moving-image signal when the (n+k)-th pixel image signal is a motion signal and when a pixel image signal corresponding to at least one surrounding pixel of a first pixel, which corresponds to the (n+k)-th pixel image signal, is a motion signal. The first through n-th pixel image signals correspond to the n pixels, respectively. The (n+1)-th through 2n-th pixel image signals correspond to the n pixels, respectively, and k is a natural number ranging from 1 to n.

BRIEF DESCRIPTION OF THE DRAWINGS

The present invention will become more apparent by describing in detail exemplary embodiments thereof with reference to the attached drawings, in which.

DETAILED DESCRIPTION OF EXEMPLARY EMBODIMENTS

Figure 1:
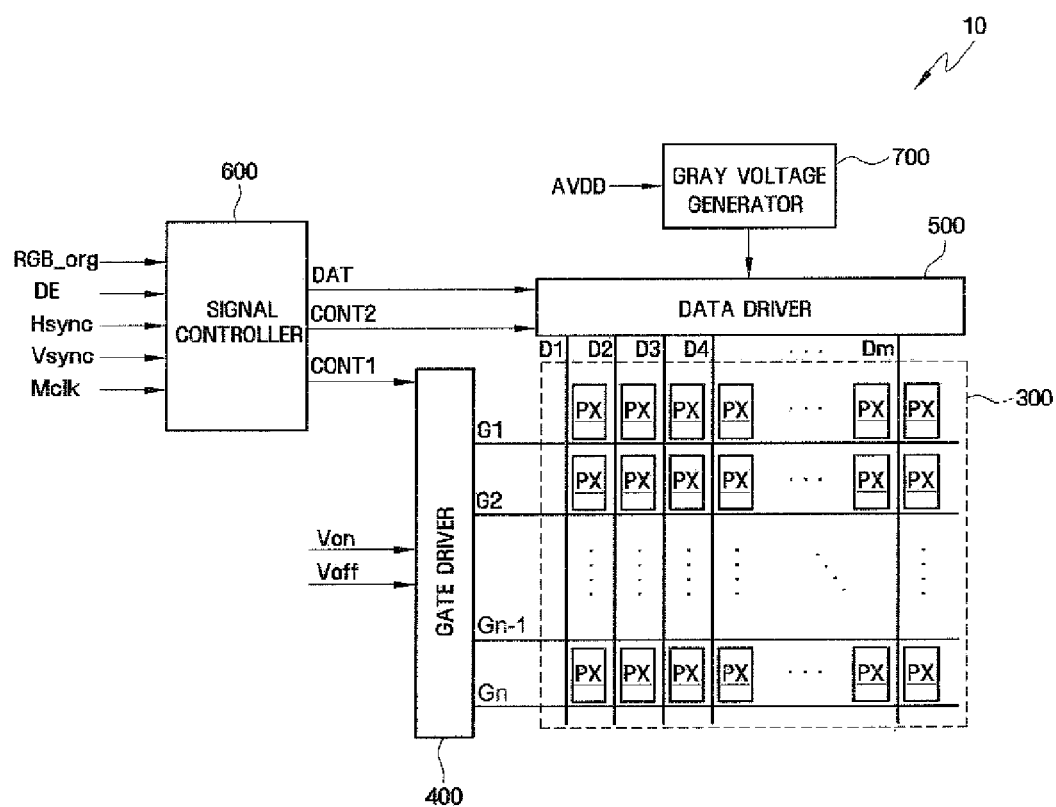
FIG. 1 is a block diagram of a liquid crystal display (LCD) according to an exemplary embodiment of the present invention.

The present invention may be understood more readily by reference to the following detailed description of exemplary embodiments and the accompanying drawings. The present invention may, however, be embodied in many different forms and should not be construed as being limited to the embodiments set forth herein. Like reference numerals refer to like elements throughout the specification.

It will be understood that when an element is referred to as being "on" another element or layer, the element or layer can be directly on another element or layer or intervening elements or layers. As used herein, the terms "rows" and "columns" of a matrix may be interchanged with "columns" and "rows" depending on an observer's point of view. For example, "rows" may be replaced by "columns" and vice versa.

Hereinafter, a liquid crystal display (LCD) and a method of driving the same according to exemplary embodiments of the present invention will be described in detail with reference to FIGS. 1 through 7.

Figure 2:
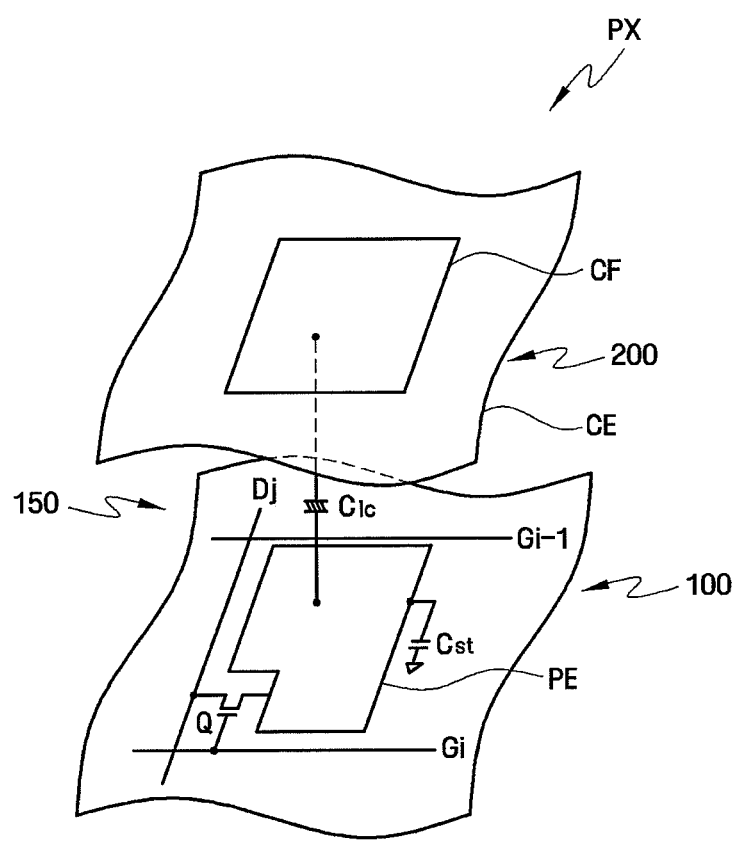
FIG. 2 is an equivalent circuit diagram of a pixel included in a display panel of FIG. 1.
Figure 3:
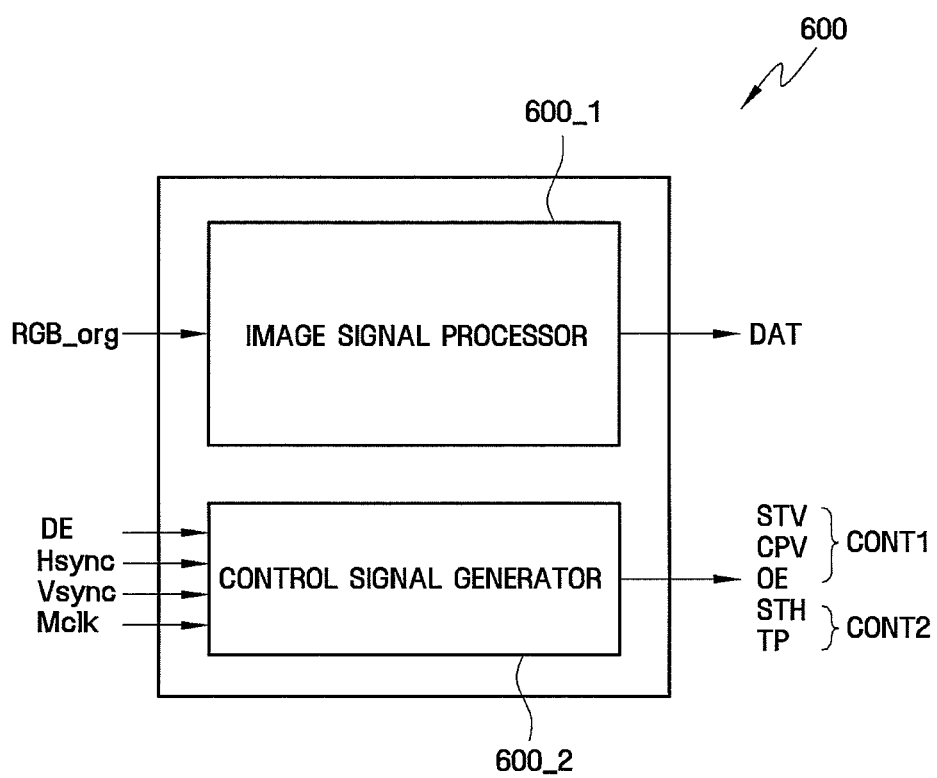
FIG. 3 is a block diagram of a signal controller shown in FIG. 1 according to an exemplary embodiment of the present invention.
Figure 4:
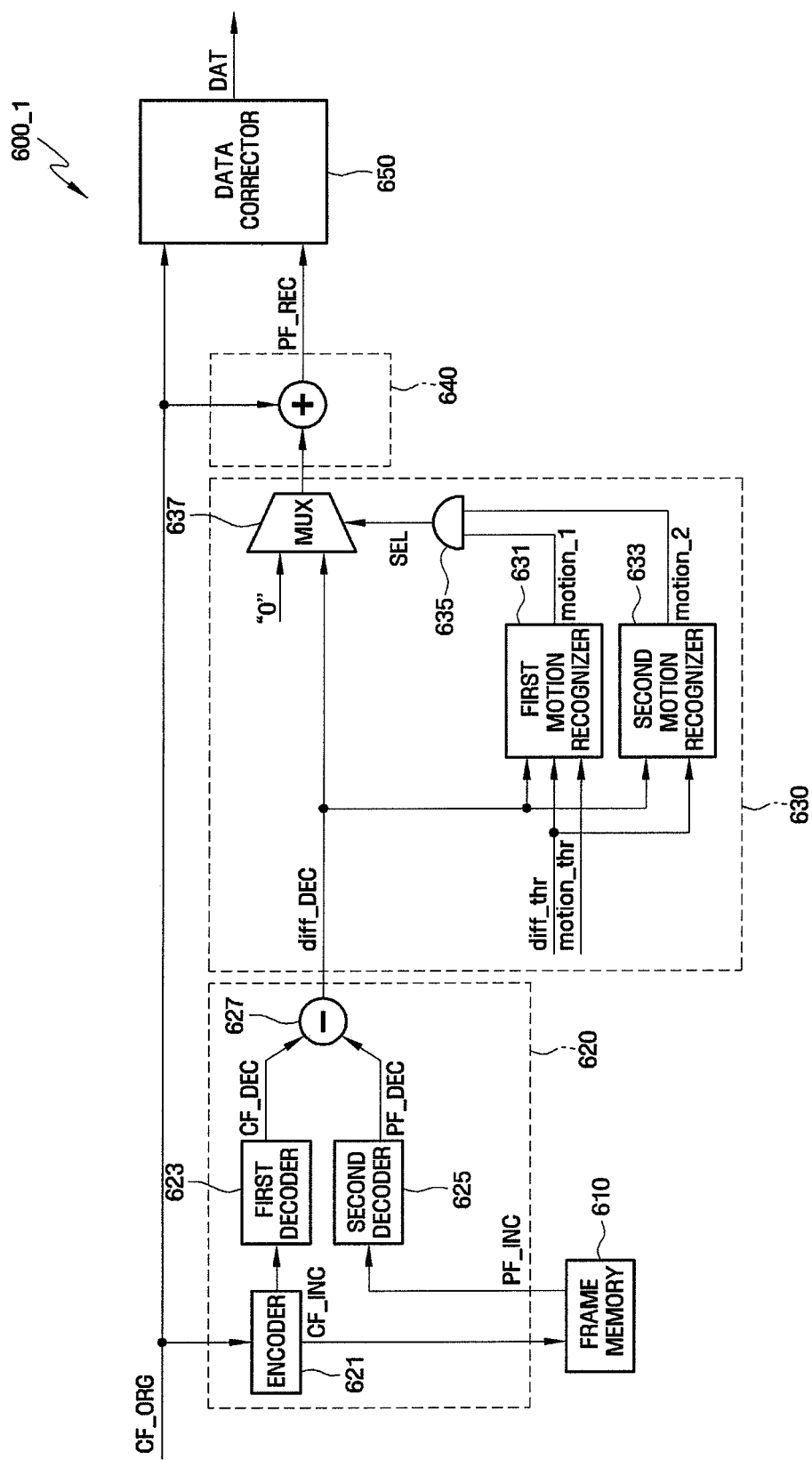
FIG. 4 is a block diagram of an image signal processor shown in FIG. 3 according to an exemplary embodiment of the present invention.
Figure 5:
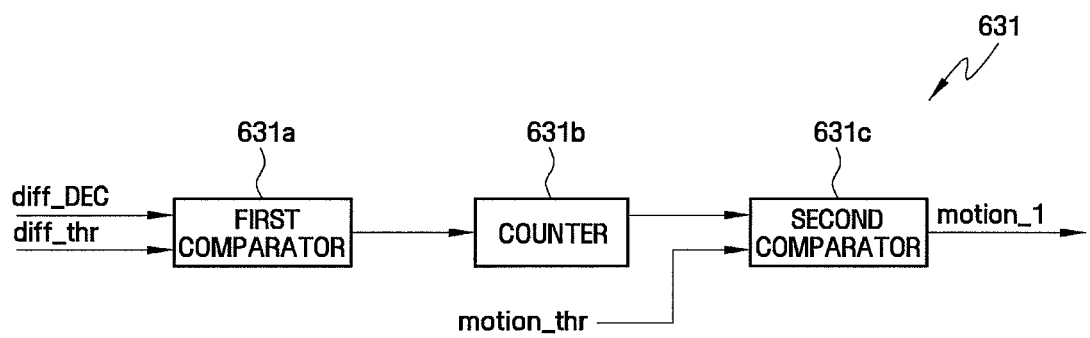
FIG. 5 is a block diagram of a first motion recognizer shown in FIG. 4 according to an exemplary embodiment of the present invention.
Figure 6:
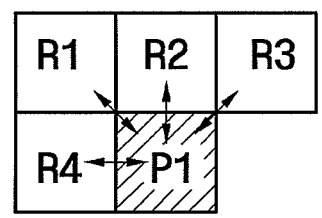
FIG. 6 is a conceptual diagram for explaining a function of a second motion recognizer shown in FIG. 4.
Figure 7:
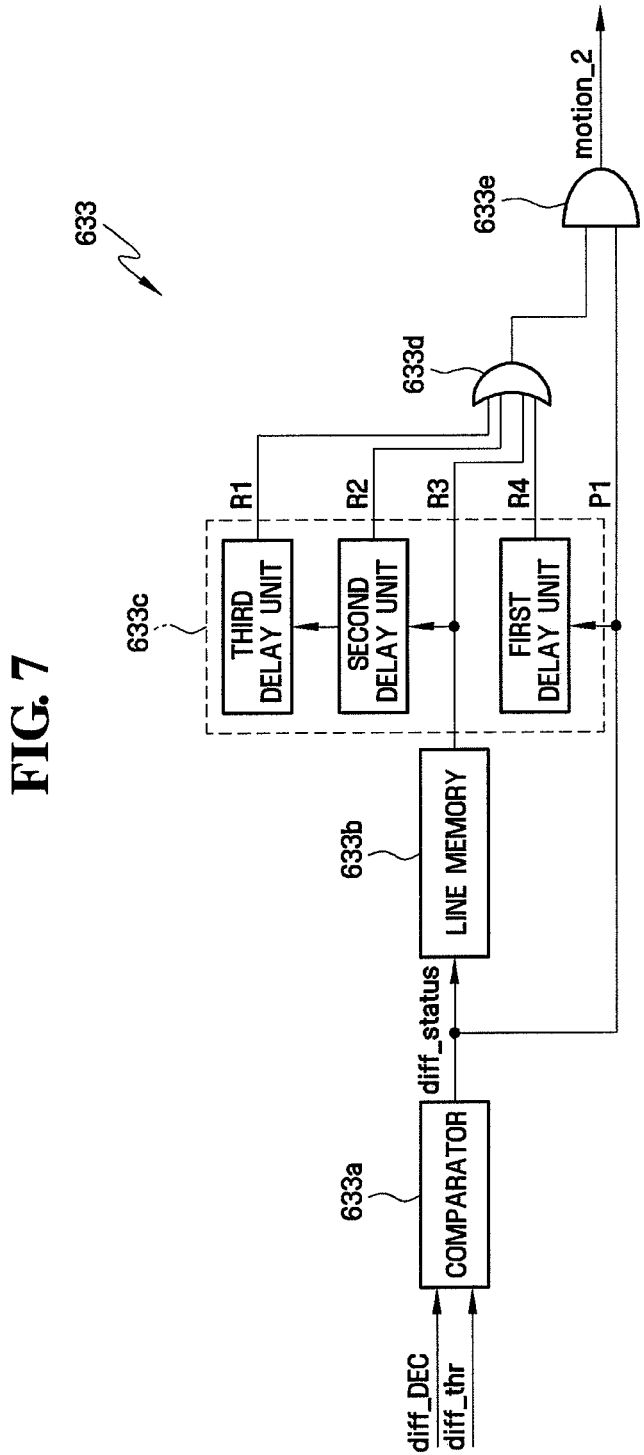
FIG. 7 is a block diagram of the second motion recognizer shown in FIG. 4 according to an exemplary embodiment of the present invention.

FIG. 1 is a block diagram of an LCD 10 according to an exemplary embodiment of the present invention. FIG. 2 is an equivalent circuit diagram of a pixel PX included in a display panel 300 of FIG. 1. FIG. 3 is a block diagram of a signal controller 600 shown in FIG. 1 according to an exemplary embodiment of the present invention. FIG. 4 is a block diagram of an image signal processor 600_1 shown in FIG. 3 according to an exemplary embodiment of the present invention. FIG. 5 is a block diagram of a first motion recognizer 631 shown in FIG. 4 according to an exemplary embodiment of the present invention. FIG. 6 is a conceptual diagram for explaining a function of a second motion recognizer 633 shown in FIG. 4. FIG. 7 is a block diagram of the second motion recognizer 633 shown in FIG. 4 according to an exemplary embodiment of the present invention.

Referring to FIG. 1, the LCD 10 includes the display panel 300, the signal controller 600, a gate driver 400, a data driver 500, and a gray voltage generator 700. The display panel 300 includes a plurality of gate lines G1 through Gn, a plurality of data lines D1 through Dm, and a plurality of pixels PX. The gate lines G1 through Gn extend in a first direction to be substantially parallel to each other, and the data lines D1 through Dm extend in a second direction to be substantially parallel to each other. In an exemplary embodiment of the present invention, the pixels PX are disposed in regions in which the gate lines G1 through Gn cross the data lines D1 through Dm, respectively. The gate driver 400 transmits a plurality of gate signals to the gate lines G1 through Gn, respectively, and the data driver 500 transmits a plurality of image data voltages to the data lines D1 through Dm, respectively. The pixels PX display images in response to the image data voltages, respectively.

The signal controller 600 may output a display data signal DAT to the data driver 500, and the data driver 500 may output the image data voltages corresponding to the display data signal DAT. Since the pixels PX of the display panel 300 display images in response to the image data voltages, respectively, the pixels display the images corresponding to the display data signal DAT.

Referring to the equivalent circuit diagram of FIG. 2, each pixel PX is electrically connected to an $i^{th}$ (i=1 to 1) gate line Gi and a $j^{th}$ (j=1 to m) data line Dj. In addition, each pixel PX includes a switching device Q, which is connected to the $i^{th}$ gate line Gi and the $j^{th}$ data line Dj, and a liquid crystal capacitor Clc and a storage capacitor Cst which are connected to the switching device Q. The liquid crystal capacitor Clc may include two electrodes (e.g., a pixel electrode PE formed on a first substrate 100 and a common electrode CE formed on a second substrate 200) and liquid crystal molecules 150 interposed between the first substrate 100 and the second substrate 200. A color filter CF may be disposed proximate to the common electrode CE. The display panel 300 may include "n" pixels (e.g., "n" is a natural number), and the "n" pixels may be arranged in a matrix.

In an exemplary embodiment of the present invention, the storage capacitor Cst may be omitted. In an exemplary embodiment of the present invention, the common electrode CE may be disposed on the first substrate and the color filter CF may be disposed on the second substrate. In an alternate exemplary embodiment of the present invention, the color filter CF may be disposed on the first substrate and the common electrode CE may be disposed on the second substrate. In an exemplary embodiment of the present invention, the color filter CF and the common electrode CE may be disposed on the first substrate.

Referring back to FIG. 1, the signal controller 600 receives an original image signal RGB_org and external control signals (e.g., such as a data enable signal DE, a horizontal synchronization signal Hsync, a vertical synchronization signal Vsync, and a main clock signal Mclk) for controlling the display of the original image signal RGB_org and outputs the display data signal DAT, a gate control signal CONT1, and a data control signal CONT2. The original image signal RGB_org may denote an image signal before being corrected by the signal controller 600, and the display data signal DAT may denote an image signal on which the signal controller 600 has performed data correction. For ease of description, the original image signal RGB_org before being corrected by the signal controller 600 will hereinafter be referred to as an image signal of a previous frame or a current frame. However, depending on the reference character used, the original image signal RGB_org may also denote the display data signal DAT obtained after the original image signal RGB_org is corrected.

The signal controller 600 may receive the original image signal RGB_org and output the display data signal DAT. The signal controller 600 may also receive the external control signals from an external source and generate the gate control signal CONT1 and the data control signal CONT2. Examples of the external control signals include the vertical synchronization signal Vsync, the horizontal synchronization signal Hsync, the main clock signal Mclk, and the data enable signal DE. The gate control signal CONT1 is used to control the operation of the gate driver 400, and the data control signal CONT2 is used to control the operation of the data driver 500.

The gate driver 400 receives the gate control signals CONT1 from the signal controller 600 and transmits the gate signals to the gate lines G1 through Gn, respectively. Each of the gate signals may be a gate-on voltage Von or a gate-off voltage Voff provided by a gate on/off voltage generator (not shown).

The data driver 500 receives the data control signal CONT2 from the signal controller 600 and applies the image data voltages, which correspond to the display data signal DAT, to the data lines D1 through Dm, respectively. The image data voltages corresponding to the display data signal DAT may be provided by the gray voltage generator 700.

The gray voltage generator 700 may divide a driving voltage AVDD into a plurality of image data voltages based on the gray level of the display data signal DAT and provide the image data voltages to the data driver 500. The gray voltage generator 700 may include a plurality of resistors connected in series between a node, to which the driving voltage AVDD is applied, and a ground source. Thus, the gray voltage generator 700 may divide the level of the driving voltage AVDD and generate a plurality of gray voltages. The internal circuit of the gray voltage generator 700 is not limited to the above example and may be implemented in various ways. In an exemplary embodiment of the present invention, the gray-scale voltage generator 700 divides a driving voltage AVDD into a plurality of gray reference voltages that may be provided to the data driver 500. The data driver 500 may divide the gray reference voltages into the image data voltages corresponding to the display data signals.

Referring to FIG. 3, the signal controller 600 may include an image signal processor 600_1 and a control signal generator 600_2. The image signal processor 600_1 may receive the original image signal RGB_org and determine whether to correct a plurality of pixel image signals included in the original image signal RGB_org, which may improve the display quality of the LCD 10. Based on the determination, the image signal processor 600_1 may correct the pixel image signals and output the display data signal DAT.

The control signal generator 600_2 may receive the external control signals (e.g., such as the data enable signal DE, the horizontal synchronization signal Hsync, the vertical synchronization signal Vsync, and the main clock signal Mclk) from the external source and generate the gate control signal CONT1 and the data control signal CONT2. The gate control signal CONT1 is used to control the operation of the gate driver 400. The gate control signal CONT1 may include a vertical start signal STV for starting the gate driver 400, a gate clock signal CPV for determining when to output the gate-on voltage Von, and an output enable signal OE for determining the pulse width of the gate-on voltage Von.

The data control signal CONT2 is used to control the operation of the data driver 500. The data control signal CONT2 may include a horizontal start signal STH for starting the data driver 500 and an output instruction signal TP for instructing the output of an image data voltage.

Referring to FIG. 4, the image signal processor 600_1 may include a frame memory 610, a data converter 620, a moving-image determiner 630, a data output unit 640, and a data corrector 650. The data converter 620 may include an encoder 621, first decoder 623, second decoder 625, and a subtracter 627. The encoder 621 may sequentially receive an original image signal PF_ORG of a previous frame and an original image signal CF_ORG of a current frame and compress the received image signals PF_ORG and CF_ORG, respectively. If the display panel 300 (see FIG. 1) includes "n" pixels arranged in a matrix, the original image signal PF_ORG of the previous frame includes first through $n^{th}$ pixel image signals corresponding to the "n" pixels, respectively, and the original image signal CF_ORG of the current frame includes $(n+1)^{th}$ through $2n^{th}$ pixel image signals corresponding to the "n" pixels, respectively. Although only the original image signal CF_ORG of the current frame is input to the encoder 621 in FIG. 4, the original image signal PF_ORG of the previous frame which includes the first through $n^{th}$ pixel image signals and the original image signal CF_ORG of the current frame which includes the $(n+1)^{th}$ through $2n^{th}$ pixel image signals may both be input to the encoder 621, sequentially.

The encoder 621 may receive and compress the original image signal CF_ORG of the current frame and provide a compressed image signal CF_INC of the current frame to the frame memory 610. The frame memory 610 may store the compressed image signal CF_INC of the current frame during a frame and output a compressed image signal PF_INC of the previous frame. The first decoder 623 and second decoder 625 may receive and decode the compressed image signals CF_INC and PF_INC of the current and previous frames, respectively. For example, the second decoder 625 may decode the compressed image signal PF_INC of the previous frame which was stored in the frame memory 610 for a frame and then output a decoded image signal PF_DEC of the previous frame. The first decoder 623 may receive the compressed image signal CF_INC of the current frame from the encoder 621 and decode the compressed image signal CF_INC of the current frame to generate a decoded image signal CF_DEC of the current frame.

The subtracter 627 may calculate a difference diff_DEC between the decoded image signal CF_DEC of the current frame which is output from the first decoder 623 and the decoded image signal PF_DEC of the previous frame which is output from the second decoder 625. As described above, the first through $n^{th}$ pixel image signals correspond to the original image signal PF_ORG of the previous frame, and the $(n+1)^{th}$ through $2n^{th}$ pixel image signals correspond to the original image signal CF_ORG of the current frame. Thus, calculating the difference diff_DEC between the decoded image signals CF_DEC and PF_DEC of the current and previous frames may denote sequentially calculating the difference diff_DEC between a $k^{th}$ pixel image signal of the decoded image signal PF_DEC of the previous frame and a $(n+k)^{th}$ pixel image signal of the decoded image signal CF_DEC of the current frame, wherein "k" is a natural number ranging from 1 to n.

If an image signal is compressed and then decoded, the resultant data may include errors. Therefore, the difference diff_DEC between the decoded image signal CF_DEC of the current frame, which is obtained by compressing and decoding the original image signal CF_ORG of the current frame in the same way as the original image signal PF_ORG of the previous frame, and the decoded image signal PF_DEC of the previous frame is used, instead of using the original image signal CF_ORG of the current frame and the decoded image signal PF_DEC of the previous frame.

The difference diff_DEC between the decoded image signal CF_DEC of the current frame and the decoded image signal PF_DEC of the previous frame is calculated. Then, data obtained by adding the difference diff_DEC to the original image signal CF_ORG of the current frame may be denoted as a reconstructed image signal PF_REC of the previous frame. The reconstructed image signal PF_REC of the previous frame is compared with the original image signal CF_ORG of the current frame to determine whether to correct the $(n+k)^{th}$ pixel image signal of the original image signal CF_ORG of the current frame.

In summary, the data converter 620 may sequentially receive, compress, and decode the first through $2n^{th}$ pixel image signals corresponding to the original image signals PF_ORG and CF_ORG of the previous and current frame. Then, the data converter 620 may sequentially calculate the difference diff_DEC between the $k^{th}$ pixel image signal of the decoded image signal PF_DEC of the previous frame and the $(n+k)^{th}$ pixel image signal of the decoded image signal CF_DEC of the current frame. Next, the data converter 620 may provide the calculation result (e.g., the difference diff_DEC) to the moving-image determiner 630.

As illustrated in FIG. 4, the moving-image determiner 630 may include the first motion recognizer 631, the second motion recognizer 633, a select signal generator 635, and a multiplexer (MUX) 637. The difference diff_DEC between the decoded image signals CF_DEC and PF_DEC of the current and previous frames, which is output from the data converter 620, may be provided to the first motion recognizer 631, the second motion recognizer 633, and the multiplexer 637.

The first motion recognizer 631 compares the difference diff_DEC between the decoded image signals PF_DEC and CF_DEC of the previous and current frames (e.g., the difference diff_DEC between the $k^{th}$ pixel image signal of the decoded image signal PF_DEC of the previous frame and the $(n+k)^{th}$ pixel image signal of the decoded image signal CF_DEC of the current frame) with a first reference value diff_thr. If the difference diff_DEC exceeds the first reference value diff_thr, the first motion recognizer 631 recognizes the $(n+k)^{th}$ pixel image signal as a motion signal. If the difference diff_DEC is less than or equal to the first reference value diff_thr, the first motion recognizer 631 recognizes the $(n+k)^{th}$ pixel image signal as a non-motion signal. In addition, the first motion recognizer 631 determines whether the decoded image signal CF_DEC of the current frame is a moving-image signal based on the current number of motion signals and non-motion signals among the (n+1)th through 2n pixel image signals which are recognized.

The first motion recognizer 631 may increase or decrease a value of a counter based on the current number of motion signals and non-motion signals recognized. Then, the first motion recognizer 631 may compare the value of the counter with a second reference value motion_thr and determine whether the decoded image signal CF_DEC of the current frame including the (n+1)th through the $(2n)^{th}$ pixel image is a moving-image signal. Based on whether the decoded image signal CF_DEC of the current frame is a moving-image signal, the first motion recognizer 631 may generate a first motion detect signal motion_1 and provide the first motion detect signal motion_1 to the select signal generator 635. For example, the first motion recognizer 631 may compare the (n+1)th through $(2n)^{th}$ pixel image signals of the current frame with the $1^{st}$ through $n^{th}$ pixel image signals of the previous frame, respectively. When recognizing the decoded image signal CF_DEC of the current frame as a moving-image signal, the first motion recognizer 631 may generate the first motion detect signal at a first level (e.g., level "1").

The second motion recognizer 633 receives the difference diff_DEC between the $k^{th}$ pixel image signal of the decoded image signal PF_DEC of the previous frame and the $(n+k)^{th}$ pixel image signal of the decoded image signal CF_DEC of the current frame and the first reference value diff_thr, and compares the difference diff_DEC with the first reference value diff_thr. When the $(n+k)^{th}$ pixel image signal is recognized as a motion signal, if a pixel image signal corresponding to at least one pixel surrounding a pixel, which corresponds to the $(n+k)^{th}$ pixel image signal recognized as a motion signal, is a motion signal, the second motion recognizer 633 recognizes the decoded image signal CF_DEC of the current frame as a moving-image signal.

The second motion recognizer 633 sequentially calculates the difference diff_DEC between (n+1)th through $(2n)^{th}$ pixel image signals of the current frame with the $1^{st}$ through $n^{th}$ pixel image signals of the previous frame, respectively. Then, the second motion recognizer 633 sequentially stores a status value of the first level when the $(n+k)^{th}$ pixel image signal is a motion signal and a status value of a second level when the $(n+k)^{th}$ pixel image signal is a non-motion signal. When a status value corresponding to at least one pixel surrounding a pixel which corresponds to the $(n+k)^{th}$ pixel image signal is the first level, the second motion recognizer 633 may provide a second motion detect signal motion_2 to the select signal generator 635. For example, if the decoded image signal CF_DEC of the current frame including $(n+k)^{th}$ pixel image signal is recognized as a moving-image signal since the status value corresponding to at least one of the pixels surrounding the pixel which corresponds to the $(n+k)^{th}$ pixel image signal is the first level, the second motion recognizer 633 may generate the second motion detect signal motion_2 at the first level (e.g., level "1").

The select signal generator 635 may receive the first and second motion detect signals motion_1 and motion_2 respectively from the first and second motion recognizers 631 and 633 and provide a select signal SEL to the multiplexer 637 based on the first and second motion detect signals motion_1 and motion_2. As illustrated in FIG. 4, the select signal generator 635 may include an AND gate. Thus, when both of the first and second motion detect signals motion_1 and motion_2 are set to the first level (e.g., when the decoded image signal CF_DEC of the current frame is recognized as a moving-image signal base on the $(n+k)^{th}$ pixel image signal) the select signal generator 635 may provide the select signal SEL set to the first level to the multiplexer 637. Accordingly, the multiplexer 637 may output the difference diff_DEC between the decoded image signals PF_DEC and CF_DEC of the previous and current frames.

As described above, the multiplexer 637 may receive the select signal SEL from the select signal generator 635 and output the difference diff_DEC between the decoded image signals PF_DEC and CF_DEC of the previous and current frames. When the decoded image signal CF_DEC_of the current frame is recognized as a moving-image signal including the $(n+k)^{th}$ pixel image signal is recognized as a moving-image signal, the select signal generator 635 may provide the select signal SEL set to the first level. In response to the select signal SEL set to the first level, the multiplexer 637 may provide the difference diff_DEC between the decoded image signals PF_DEC and CF_DEC of the previous and current frames to the data output unit 640. When the decoded image signal CF_DEC_of the current frame including the $(n+k)^{th}$ pixel image signal is recognized as a still-image signal, the select signal generator 635 may provide the select signal SEL set to the second level, which is different from the first level. Accordingly, the multiplexer 637 may output a "zero (0)" signal, instead of the difference diff_DEC between the decoded image signals PF_DEC and CF_DEC of the previous and current frames.

When the multiplexer 637 outputs the difference diff_DEC between the decoded image signals PF_DEC and CF_DEC of the previous and current frames in response to the select signal SEL set to the first level, the data output unit 640 may add the original image signal CF_ORG of the current frame to the difference diff_DEC and output the reconstructed image signal PF_REC of the previous frame. For example, the data output unit 640 may add the difference diff_DEC between the decoded image signals PF_DEC and CF_DEC of the previous and current frames to the original image signal CF_ORG of the current frame and output the reconstructed image signal PF_REC of the previous frame. Alternately, when the multiplexer 637 provides the "zero" signal, instead of the difference diff_DEC, in response to the select signal SEL set to the second level, the data output unit 640 may output the image signal CF_ORG of the current frame to the data corrector 650 as the reconstructed image signal PF_REC of the previous frame. In this way, the likelihood that noise and errors, which result from compression, in the reconstructed image signal PF_REC of the previous frame that may erroneously cause a still image signal CF_ORG of the current frame to be recognized as a moving-image signal may be reduced or eliminated.

The data corrector 650 may receive the original image signal CF_ORG of the current frame and the reconstructed image signal PF_REC of the previous frame and may or may not correct the $(n+k)^{th}$ pixel image signal. The data corrector 650 may generate a corrected image signal using the reconstructed image signal PF_REC of the previous frame and the original image signal CF_ORG of the current frame, which may reduce a response time of liquid crystals of the LCD 10. The data corrector 650 may generate the corrected image signal using a Dynamic Capacitance Compensation (DCC) driving method. The data corrector 650 may compare the reconstructed image signal PF_REC of the previous frame with the original image signal CF_ORG of the current frame and generate an interpolated image signal inserted between the image signals PF_REC and CF_ORG of the previous and current frames, thereby increasing a frame driving frequency. The interpolated signal may be used to enhance motion blur characteristics of moving images. The data corrector 650 may also use various correction methods according to what the LCD 10 is used for.

In FIG. 4, the moving-image determiner 630 includes the first and second motion recognizers 631 and 633, and the select signal generator 635 receives the first and second motion detect signals motion_1 and motion_2 and generates the select signal SEL. However, the first or second motion recognizer 631 or 633 alone may also determine whether to correct the $(n+k)^{th}$ pixel image signal. In this example, the select signal generator 635 may be omitted.

For example, if the first motion recognizer 631 alone determines whether the decoded image signal CF_DEC_of the current frame including the $(n+k)^{th}$ pixel image signal is a moving-image signal, it may generate the first motion detect signal motion_1 and provide the first motion detect signal motion_1 to the multiplexer 637. In response to the first motion detect signal motion$_{-1}$, the multiplexer 637 may or may not output the difference diff_DEC between the decoded image signals PF_DEC and CF_DEC of the previous and current frames. Likewise, if the second motion recognizer 633 alone determines whether the decoded image signal CF_DEC_of the current frame including the $(n+k)^{th}$ pixel image signal is a moving-image signal, it may generate the second motion detect signal motion_2 and provide the second motion detect signal motion_2 to the multiplexer 637. In response to the second motion detect signal motion_2, the multiplexer 637 may or may not output the difference diff_DEC between the decoded image signals PF_DEC and CF_DEC of the previous and current frames.

Referring to FIG. 5, the first motion recognizer 631 may include a first comparator 631a, a counter 631b, and a second comparator 631c. The first comparator 631a may sequentially compare the difference diff_DEC between the $1^{st}$ through the $n^{th}$ pixel image signals and the $(n+1)^{th}$ through $(2n)^{th}$ pixel image signals received from the data converter 620 (see FIG. 4) with the first reference value diff_thr and transmit the comparison results to the counter 631b. When the difference diff_DEC is greater than the first reference value diff_thr, the first comparator 631a may recognize the $(n+k)^{th}$ pixel image signal as a motion signal and transmit an up signal UP to the counter 631b. Alternately, when the difference diff_DEC is equal to or less than the first reference value diff_thr, the first comparator 631a may recognize the $(n+k)^{th}$ pixel image signal as a non-motion signal and transmit a down signal DOWN to the counter 631b. For example, when the difference diff_DEC between the $k^{th}$ pixel image signal and the $(n+k)^{th}$ pixel image signal exceeds the first reference value diff_thr, it can be recognized that a different image from the previous frame is displayed on a corresponding pixel.

The counter 631b may count the number of motion signals and the number of non-motion signals based on the comparison results of the first comparator 631a. When receiving the up signal UP from the first comparator 631a, the counter 631b may increase (e.g., increment) its value by a predetermined unit value (e.g., one). Alternately, when receiving the down signal DOWN from the first comparator 631a, the counter 631b may decrease its value by a predetermined unit value (e.g., one). In the example of the down signal DOWN (e.g., when the $(n+k)^{th}$ pixel image signal is recognized as a non-motion signal), the value of the counter 631b may be reduced (e.g., decremented).

For example, if the display panel 300 (see FIG. 1) includes "n" pixels, a maximum value of the counter 631b may be set to "n." Then, in at least one embodiment of the present invention, whenever each pixel image signal is recognized as a motion signal or a non-motion signal, the value of the counter 631b may be increased or reduced by a predetermined unit value. The maximum value of the counter 631b may be "n," and a minimum value thereof may be "0."

In at least one embodiment of the present invention, even when the number of motion signals continuously increases, the value of the counter 631b may be prevented from exceeding "n." Alternately, even when the number of non-motion signals continuously decreases, the value of the counter 631b may be prevented from falling under "0." Therefore, the process of refreshing the counter 631b every frame can be omitted, and whether each pixel image signal needs to be corrected can be determined in real time. The maximum value of the counter 631b may also be set to the number of pixels in a line, for example, "m."

By setting the maximum value of the counter 631b to the number of pixels included in a frame or a line (e.g., "n" or "m"), it can be determined whether pixel image signals corresponding to the number of pixels included in a previous frame or line of each pixel, which corresponds to a pixel image signal whose correction is to be determined, are motion signals.

The second comparator 631c may compare the value of the counter 631b with the second reference value motion_thr. When the value of the counter 631b is greater than the second reference value motion_thr, the second comparator 631c may generate the first motion detect signal motion_1 at the first level. For example, when the value of the counter 631b is greater than the second reference value motion_thr, it may be determined that more than a predetermined proportion of pixel image signals, which correspond respectively to an equal number of pixels to the maximum value of the counter 631b, are motion signals. Therefore, the second comparator 631c may compare the value of the counter 631b with the second reference value motion_thr and generate the first motion detect signal motion_1 based on the comparison result.

When the value of the counter 631b is greater than the second reference value motion_thr, the second comparator 631c may generate the first motion detect signal motion_1 set to the first level. Alternately, when the value of the counter 631b is equal to or less than the second reference value motion_thr, the second comparator 631c may generate the first motion detect signal motion_1 set to the second level, which is different from the first level. In at least one embodiment of the present invention, the first level may be "1," and the second level may be "0."

In summary, the first motion recognizer 631 may compare the difference diff_DEC between the $k^{th}$ pixel image signal and the $(n+k)^{th}$ pixel image signal with the first reference value diff_thr and increase or decrease the value of the counter 631b based on the comparison result. Then, the first motion recognizer 631 may compare the increased or decreased value of the counter 631b with the second reference value motion_thr and generate the first motion detect signal motion_1 at the first or second level based on the comparison result. The first reference value diff_thr and the second reference value motion_thr may be stored as parameters in an external memory, such as an electrically erasable programmable read-only memory (EEPROM) or a flash memory, and may be adjusted.

When the maximum value of the counter 631b is set to the number of pixels included in a frame (e.g., when a change in a pixel during one previous frame is detected), noise can be removed from a still image. When the maximum value of the counter 631b is set to the number of pixels included in a line (e.g., when a change in a pixel during one previous line is detected), whether an image is a moving image can be more accurately determined even if the image is small.

Referring to FIGS. 6 and 7, the second motion recognizer 633 may include a comparator 633a, a line memory 633b, first through third delay units 633c, a surrounding pixel recognizer 633d, and a signal generator 633e. Referring to FIG. 6, when the comparator 633a recognizes the $(n+k)^{th}$ pixel image signal corresponding to a pixel P1 as a motion signal, it may check the status values diff_status of pixels surrounding the pixel P1 (e.g., the status values diff_status of a left diagonal pixel R1, an upper pixel R2, a right diagonal pixel R3, and a left pixel R4 which are located left diagonal to, above, right diagonal to, and on the left side of the pixel P1, respectively). When at least one of the surrounding pixels has the status value diff_status at the first level, the decoded image signal CF_DEC_of the current frame including the $(n+k)^{th}$ pixel image signal may be determined to be a moving-image signal and the $(n+k)^{th}$ pixel image signal may be corrected by the data corrector 650.

Referring to FIG. 7, the comparator 633a may operate in substantially the same way as the first comparator 631a (see FIG. 5) of the first motion recognizer 631 (see FIG. 5). For example, the comparator 633a may sequentially compare the difference diff_DEC between the $1^{st}$ through the $n^{th}$ pixel image signals and the $(n+1)^{th}$ through $(2n)^{th}$ pixel image signals received from the data converter 620 (see FIG. 4) with the first reference value diff_thr. In addition, the comparator 633a may set the status value diff_status for each pixel image signal based on the result of comparing the difference diff_DEC and the first reference value diff_thr. When the difference diff_DEC is greater than the first reference value diff_thr and thus the $(n+k)^{th}$ pixel image signal is recognized as a motion signal, the comparator 633a may set the status value diff_status to the first level. Likewise, when the difference diff_DEC is equal to or less than the first reference value diff_thr and thus the $(n+k)^{th}$ pixel image signal is recognized as a non-motion signal, the comparator 633a may set the status value diff_status to the second level which is different from the first level. In one exemplary embodiment, the comparator 633a may be omitted. A result of the first comparator 631a (see FIG. 5) of the first motion recognizer 631 (see FIG. 5) may be transmitted to the line memory 633b.

The line memory 633b may store the status value diff_status set by the comparator 633a in units of rows of a matrix. As described above, when "n" pixels are arranged in a matrix (m×l) on the display panel 300, the line memory 633b may store the status value diff_status corresponding to each pixel included in a line. For example, when there are "l" lines, each composed of "m" pixels, the status value diff_status corresponding to each of the "m" pixels may be stored.

While storing the status value diff_status corresponding to each of a plurality of pixels included in a previous line of the pixel P1, the line memory 633b may provide the status value diff_status corresponding to each of the surrounding pixels R1 through R3 of the pixel P1 which corresponds to the $(n+k)^{th}$ pixel image signal.

The first through third delay units 633c may receive the status value diff_status corresponding to each of a plurality of pixels included in a line from the line memory 633b and delay the status value diff_status. Referring to FIG. 6, the left diagonal pixel R1, the upper pixel R2, and the right diagonal pixel R3 of the pixel P1 are pixels included in a previous line to a line which includes the pixel P1. Therefore, the status value diff_status corresponding to each of the pixels R1 through R3 may be stored in the line memory 633b and delayed using the second and third delay units 633c. Since the left pixel R4 located on the left side of the pixel P1 is included in the same line as the pixel P1, it may be delayed by one pixel using the first delay unit 633c.

As illustrated in FIG. 7, the surrounding pixel recognizer 633d may include an OR gate. For example, the surrounding pixel recognizer 633d may receive from the line memory or the first through third delay units 633 the status value diff_status corresponding to each of the left diagonal pixel R1, the upper pixel R2, the right diagonal pixel R3, and the left pixel R4 which are located left diagonal to, above, right diagonal to, and on the left side of the pixel P1, respectively. When at least one of the pixels R1 through R4 has the status value diff_status set to the first level, the surrounding pixel recognizer 633d may transmit a signal set to the first level to the signal generator 633e. Alternately, when none of the pixels R1 through R4 has the status value diff_status set to the first level (e.g., when all of the pixels R1 through R4 pixels have the status value diff_status set to the second level), the surrounding pixel recognizer 633d may transmit a signal set to the second level, which is different from the first level, to the signal generator 633e.

The signal generator 633e may generate the second motion detect signal motion_2 based on the status value diff_status corresponding to the pixel P1, which is received from the comparator 633a, and the status values diff_status corresponding respectively to the pixels R1 through R4, which are received from the surrounding pixel recognizer 633d. When the comparator 633a sets the status value diff_status to the first level for the pixel P1 and when the surrounding pixel recognizer 633d recognizes that the status value diff_status corresponding to at least one of the pixels R1 through R4 is set to the first level, the signal generator 633e may generate the second motion detect signal motion_2 set to the first level. As illustrated in FIG. 7, the signal generator 633e may include an AND gate. Therefore, when a pixel image signal corresponding to the pixel P1 is not a motion image signal or when none of the pixels R1 through R4 has the status value diff_status set to the first level, the signal generator 633e may generate the second motion detect signal motion_2 at the second level, which is different from the first level.

In summary, the second motion recognizer 633 may sequentially compare the difference diff_DEC between the $k^{th}$ pixel image signal and the $(n+k)^{th}$ pixel image signal with the first reference value diff_thr. Then, the second motion recognizer 633 may sequentially store the status value diff_status of the first level when the $(n+k)^{th}$ pixel image signal is a motion signal and the status value diff_status of the second level when $(n+k)^{th}$ pixel image signal is a non-motion signal. When the status value diff_status corresponding to at least one surrounding pixel of a pixel which corresponds to the $(n+k)^{th}$ pixel image signal is the first level, the second motion recognizer 633 may generate the second motion detect signal motion_2 set to the first level.

The status value diff_status may be a 1-bit signal. For example, the first level may be "1," and the second level may be "0." For example, the status value diff_status indicating whether each pixel image signal is a motion signal or a non-motion signal may be stored as a 1-bit signal, thereby reducing memory use.

When a pixel image signal corresponding to the pixel P1 is a motion signal and when at least one of the pixels R1 through R4 surrounding the pixel P1 is a motion signal, the pixel P1 may be recognized as a moving-image signal. Thus, the pixel image signal corresponding to the pixel P1 may be corrected. Alternately, when none of the pixels R1 through R4 surrounding the pixel P1 is a motion signal while the pixel image signal corresponding to the pixel P1 is recognized as a motion signal, it may be determined that the pixel P1 has been recognized as a motion signal due to a noise component. In this way, whether the pixel P1 is a moving-image signal is determined based on states of its surrounding pixels. Thus, the likelihood that a noise component causes a pixel image signal to be unnecessarily corrected may be reduced or eliminated, thereby enhancing display quality.

In an LCD and a method of driving the same according to at least one exemplary embodiment the present invention, when a difference between an image signal of a previous frame and that of a current frame for a pixel image signal is greater than a first reference value, the pixel image signal is recognized as a moving-image signal. In addition, whether each pixel image signal is a moving-image signal is determined based on the current number of motion signals and the number of non-motion signals recognized. Therefore, the likelihood that a pixel image signal is erroneously recognized as a moving-image signal due to a noise component may be reduced or eliminated. Further, since correction of a pixel image signal may be determined by checking surrounding pixels of a pixel corresponding to the pixel image signal, the noise component can be filtered, thereby enhancing display quality.

While the present invention has been particularly shown and described with reference to exemplary embodiments thereof, it will be understood by those of ordinary skill in the art that various changes in form and detail may be made therein without departing from the spirit and scope of the present disclosure.

What is claimed is:

1. A liquid crystal display (LCD) comprising:
   a display panel which comprises n pixels arranged in a matrix, wherein n is a natural number greater than 1; and
   a signal controller which sequentially receives first through n-th pixel image signals included in an image signal of a previous frame and (n+1)-th through (2n)-th pixel image signals included in an image signal of a current frame,
   sequentially calculates, for all values of k from 1 to n, a difference between a k-th pixel image signal of the first through n-th pixel image signals and an (n+k)-th pixel image signal of the (n+1)-th through 2n-th pixel image signals, recognizes, for all the values of k, the (n+k)-th pixel image signal as a motion signal when the difference is greater than a first reference value and recognizes, for all the values of k, the (n+k)-th pixel image signal as a non-motion signal when the difference is equal to or less than the first reference value, and
   determines whether the image signal of the current frame including the (n+k)-th pixel image signal is a moving-image signal or a static-image signal based on a count generated from the number of motion signals recognized and the number of non-motion signals recognized,
   wherein the first through n-th pixel image signals correspond to the n pixels, respectively, the (n+1)-th through 2n-th pixel image signals correspond to the n pixels, respectively, and k is a natural number ranging from 1 to n,
   wherein the signal controller comprises a counter that increases a value by the number of motion signals recognized and decreases the value by the number of non-motion signals recognized, and the count is set to the value.

2. The LCD of claim 1, wherein the signal controller recognizes the image signal of the current frame including the (n+k)-th pixel image signal as the moving-image signal when the (n+k)-th pixel image signal corresponding to a first pixel is the motion signal and when a pixel image signal corresponding to at least one adjacent pixel of the first pixel is the motion signal.

3. The LCD of claim 2, wherein the signal controller generates a first motion detect signal based on the numbers of the motion signals and the non-motion signals recognized, generates a second motion detect signal based on whether the pixel image signal corresponding to the at least one adjacent pixel is the motion signal, and recognizes the image signal of the current frame including the (n+k)-th pixel image signal as the moving-image signal based on the first and second motion detect signals.

4. The LCD of claim 3, wherein the signal controller comprises a counter which counts the numbers of the motion signals and the non-motion signals, increases a value of the counter by a predetermined unit value when the (n+k)-th pixel image signal is the motion signal, decreases the value of the counter by the predetermined unit value when the (n+k)-th pixel image signal is the non-motion signal, and generates the first motion detect signal when the value of the counter is greater than a second reference value.

5. The LCD of claim 4, wherein the value of the counter is equal to or less than n and is equal to or greater than zero.

6. The LCD of claim 3, wherein the signal controller sequentially stores a status value of a first level when the (n+k)-th pixel image signal is the motion signal and a status value of a second level, which is different from the first level, when the (n+k)-th pixel image signal is the non-motion signal, and generates the second motion detect signal when a status value corresponding to the at least one adjacent pixel of the first pixel, which corresponds to the (n+k)-th pixel image signal, is the first level.

7. The LCD of claim 6, wherein the status value is stored in units of rows of the matrix.

8. The LCD of claim 6, wherein the status value is a 1-bit signal.

9. The LCD of claim 1, wherein the signal controller comprises:
    an encoder which compresses the image signal of the current frame and the image signal of the previous frame;
    a frame memory which stores the compressed image signal of the current frame during a frame and outputs the compressed image signal of the previous frame stored in the frame memory; and first and second decoders which reconstruct the compressed image signals of the current and previous frames, respectively,
    wherein the first decoder receives the compressed image signal of the current frame from the encoder, and the second decoder receives the compressed image signal of the previous frame from the frame memory.

10. The LCD of claim 9, wherein the first through n-th pixel image signals correspond to a signal obtained after the second decoder reconstructs the compressed image signal of the previous frame, and the (n+1) through 2n-th pixel image signals correspond to a signal obtained after the first decoder reconstructs the compressed image signal of the current frame.

11. A method of driving a liquid crystal display (LCD), the method comprising:
    sequentially receiving first through n-th pixel image signals included in an image signal of a previous frame and (n+1)-th through (2n)-th pixel image signals included in an image signal of a current frame for a display panel of the LCD that comprises n pixels arranged in a matrix, wherein n is a natural number greater than 1;
    sequentially calculating, for all values of k from 1 to n, a difference between a k-th pixel image signal of the first through n-th pixel images signals and an (n+k)-th pixel image signal of the (n+1)-th through (2n)-th pixel image signals;
    recognizing, for all the values of k, the (n+k)-th pixel image signal as a motion signal when the difference is greater than a first reference value and recognizing, for all the values of k the (n+k)-th pixel image signal as a non-motion signal when the difference is equal to or less than the first reference value; and
    determining whether the image signal of the current frame including the (n+k)-th pixel image signal is a moving-image signal or a static-image signal based on a count generated from the number of motion signals recognized and the number of non-motion signals recognized,
    wherein the first through n-th pixel image signals correspond to the n pixels, respectively, the (n+1)-th through 2n-th pixel image signals correspond to the n pixels, respectively, and k is a natural number ranging from 1 to n,
    wherein the count is set to a value that is increased by the number of motion signals recognized and decreased by the number of non-motion signals recognized.

12. The method of claim 11, wherein the image signal of the current frame is recognized as the moving-image signal when the (n+k)-th pixel image signal is the motion signal and when a pixel image signal corresponding to at least one adjacent pixel of a first pixel, which corresponds to the (n+k)-th pixel image signal, is the motion signal.

13. The method of claim 12, wherein the determining of whether the image signal of the current frame is the moving-image signal comprises:
    generating a first motion detect signal based on the numbers of the motion signals and the non-motion signals recognized;
    generating a second motion detect signal based on whether the pixel image signal corresponding to the at least one adjacent pixel is the motion signal; and
    recognizing the image signal of the current frame including the (n+k)-th pixel image signal as the moving-image signal based on the first and second motion detect signals.

14. The method of claim 13, wherein the generating of the first motion detect signal comprises:
    providing a counter which counts the numbers of the motion signals and the non-motion signals;
    increasing a value of the counter by a predetermined unit value when the (n+k)-th pixel image signal is the motion signal;
    decreasing the value of the counter by the predetermined unit value when the (n+k)-th pixel image signal is the non-motion signal; and
    generating the first motion detect signal when the value of the counter is greater than a second reference value.

15. The method of claim 13, wherein the generating of the second motion detect signal comprises:
    sequentially storing a status value of a first level when the (n+k)-th pixel image signal is the motion signal and a status value of a second level, which is different from the first level, when the (n+k)-th pixel image signal is the non-motion signal; and
    generating the second motion detect signal when a status value corresponding to the at least one adjacent pixel of the first pixel, which corresponds to the (n+k)-th pixel image signal, is the first level.

16. A liquid crystal display (LCD) comprising:
    a display panel which comprises n pixels arranged in a matrix, wherein n is a natural number greater than 1; and
    a signal controller configured to:
    sequentially receive first through n-th pixel image signals included in an image signal of a previous frame and (n+1)-th through (2n)-th pixel image signals included in an image signal of a current frame,
    sequentially calculate, for all values of k from 1 to n, a difference between a k-th pixel image signal of the first through n-th pixel image signals and an (n+k)-th pixel image signal of the (n+1)-th through (2n)-th pixel image signals,
    recognize, for all the values of k, the (n+k)-th pixel image signal as a motion signal when the difference is greater than a first reference value and recognize, for all the values of k, the (n+k)-th pixel image signal as a non-motion signal when the difference is equal to or less than the first reference value, and recognize the image signal of the current frame including the (n+k)-th pixel image signal as a moving-image signal whenever the (n+k)-th pixel image signal of a first pixel of the pixels is the motion signal and a pixel image signal corresponding to at least one directly adjacent pixel of the first pixel is the motion signal, wherein the first through n-th pixel image signals correspond to the n pixels, respectively, the (n+1)-th through 2n-th pixel image signals correspond to the n pixels, respectively, and k is a natural number ranging from 1 to n.

17. The LCD of claim 16, wherein the signal controller is configured to sequentially store a status value of a first level when the (n+k)-th pixel image signal is the motion signal and a status value of a second level, which is different from the first level, when the (n+k)-th pixel image signal is the non-motion signal, generate a motion detect signal when a status value corresponding to the at least one adjacent pixel of the first pixel, which corresponds to the (n+k)-th pixel image signal, is the first level, and recognize the image signal of the current frame including the (n+k)-th pixel image signal as the moving-image signal based on the generated motion detect signal.

18. The LCD of claim 17, wherein the status value is a 1-bit signal.

19. A method of driving a liquid crystal display (LCD), the method comprising:

sequentially receiving first through n-th pixel image signals included in an image signal of a previous frame and (n+1)-th through (2n)-th pixel image signals included in an image signal of a current frame for a display panel of the LCD that comprises n pixels arranged in a matrix, wherein n is a natural number greater than 1;

sequentially calculating, for all values of k from 1 to n, a difference between a k-th pixel image signal of the first through n-th pixel image signals and an (n+k)-th pixel image signal of the (n+1)-th through (2n)-th pixel image signals;

recognizing, for all the values of k, the (n+k)-th pixel image signal as a motion signal when the difference is greater than a first reference value and recognizing, for all the values of k, the (n+k)-th pixel image signal as a non-motion signal when the difference is equal to or less than the first reference value; and recognizing the image signal of the current frame including the (n+k)-th pixel image signal as a moving-image signal whenever the (n+k)-th pixel image signal of a first pixel of the pixels is the motion signal and a pixel image signal corresponding to at least one directly adjacent pixel of the first pixel is the motion signal, wherein the first through n-th pixel image signals correspond to the n pixels, respectively, the (n+1)-th through 2n-th pixel image signals correspond to the n pixels, respectively, and k is a natural number ranging from 1 to n.

20. The method of claim 19, wherein the recognizing of the image signal of the current frame including the (n+k)-th pixel image signal as the moving-image signal comprises:

sequentially storing a status value of a first level when the (n+k)-th pixel image signal is the motion signal and a status value of a second level, which is different from the first level, when the (n+k)-th pixel image signal is the non-motion signal;

generating a motion signal when a status value corresponding to the at least one adjacent pixel of the first pixel, which corresponds to the (n+k)-th pixel image signal, is the first level; and recognizing the image signal of the current frame including the (n+k)-th pixel image signal as the moving-image signal based on the generated motion signal.

* * * * *